United States Patent [19]

Tatematsu et al.

[11] Patent Number: 5,169,269
[45] Date of Patent: Dec. 8, 1992

[54] ONE-STRIKE WEDGING TYPE BLANK NAIL

[76] Inventors: Shunji Tatematsu, 1-12,1-11, Joudoji Koyama-cho, Sakyo-ku, Kyoto, Japan; Iwao Kaizaki, 3-327-12, Nakayama-cho, Nishi, Nara, Japan; Tomiyoshi Mihara, 3-26-4 Nakahama, Ikuno-Ku, Osaka, Japan

[21] Appl. No.: 827,135

[22] Filed: Jan. 28, 1992

[51] Int. Cl.⁵ ............................................. F16B 13/04
[52] U.S. Cl. ....................................... 411/24; 411/54; 411/58; 411/75; 403/297
[58] Field of Search ..................... 411/15, 24, 26, 354, 411/25, 27, 58, 40, 41, 54, 28, 32, 33, 75, 78, 79, 80; 403/297, 280

[56] References Cited

U.S. PATENT DOCUMENTS

| | | | |
|---|---|---|---|
| 508,254 | 11/1893 | Steward | 411/26 |
| 1,150,358 | 8/1915 | Gilmer | 403/280 |
| 1,349,437 | 8/1920 | Royer | 411/24 |
| 1,639,231 | 8/1927 | Ogden | 411/26 |
| 1,808,318 | 6/1931 | Pleister | 411/41 |
| 1,832,706 | 11/1931 | Hoshor | 403/280 |
| 3,216,305 | 11/1965 | Kaplan et al. | 411/58 |
| 3,438,659 | 5/1969 | Waldron | 411/24 X |
| 3,954,345 | 5/1976 | Morris | 403/297 |
| 4,093,389 | 6/1978 | Wibrow | 403/297 |

FOREIGN PATENT DOCUMENTS

| | | | |
|---|---|---|---|
| 58209 | 8/1982 | European Pat. Off. | 411/24 |
| 909931 | 5/1946 | France | 403/297 |
| 932765 | 4/1948 | France | 411/24 |

Primary Examiner—Rodney M. Lindsey
Attorney, Agent, or Firm—Moonray Kojima

[57] ABSTRACT

This invention relates to one-strike wedging type blank nails for use in rigidly joining, in a simple operation, wooden articles in manufacture of furniture, or ceramic articles (such as roofing or other tiles) or metallic articles in the building and construction industry, for example. Such a blank nail includes a main body in the form of a hollow pipe, and a pair of expander elements attached to opposite ends of the main body. The main body defines split slots extending axially at the opposite ends thereof to form wedging portions. Each of the expander elements includes a contained portion fitted into the main body, a large diameter portion having a larger diameter than the contained portion, and a flare portion formed between and continuous steplessly with the contained portion and large diameter portion. The large diameter portion defines an outward end surface acting as an input surface for receiving a compressive force applied in a direction to move the expander elements toward each other. This construction allows wooden articles, metallic articles or tiles to be joined simply and rigidly.

2 Claims, 11 Drawing Sheets

ONE-STRIKE WEDGING TYPE BLANK NAIL

SUMMARY OF THE INVENTION

This invention provides one-strike wedging type blank nails for use in rigidly joining, in a simple operation, wooden articles in manufacture of furniture, or ceramic articles (such as roofing or other tiles) or metallic articles in the building and construction industry, for example. Such a blank nail includes a main body in the form of a hollow pipe, and a pair of expander elements attached to opposite ends of the main body. The main body defines split slots extending axially at the opposite ends thereof to form wedging portions. Each of the expander elements includes a contained portion fitted into the main body, a large diameter portion having a larger diameter than the contained portion, and a flare portion formed between and continuous steplessly with the contained portion and large diameter portion. The large diameter portion defines an outward end surface acting as an input surface for receiving a compressive force applied in a direction to move the expander elements toward each other. This construction allows wooden articles, metallic articles or tiles to be joined simply and rigidly.

BACKGROUND OF THE INVENTION

Generally, wood screws defining a peripheral spiral is used, rather than ordinary nails, to join wooden articles rigidly, for example. This is because the wood screws have a greater tightening force and a shorter curing period, with the peripheral spiral cutting into the wood fiber to perform a retaining function.

However, an operation to screw in the wood screw requires the wood screw to be maintained constantly upright while being turned, to be pressed hard in a screwing direction, and to maintain two boards to be joined in pressure contact with each other. Expert skill is essential to this screwing operation. If, for example, the wood screw tilts during the screwing operation, the spiral intended to perform the retaining function will damage the wood fiber, thereby reducing the tightening force, and greatly deteriorating joinder retention.

Moreover, when the wood screw is extended through a mounting board and subsequently screwed to a board to be attached, the screwing speed is reduced, a gap tends to be formed between the two boards, and the operation is time-consuming.

When wooden articles are joined by nails or wood screws, the wooden articles are just penetrated by the nails or wood screws. No force is applied for positively maintaining the two boards in pressure contact. Gaps tend to occur when the joinder retention deteriorates with vibrations or the like of products during transport. Further, retaining strength is variable with types of surfaces to which wood screws are applied. The retaining strength is weaker for a butt end surface than for a cross grain or straight grain surface.

When articles are joined by wood screws, the effect of design is impaired by the large, slotted or Phillips heads of the wood screws. A covering operation to avoid the reduction in the design effect is not easy or effective since the heads of the wood screws are relatively large.

OBJECTS OF THE INVENTION

A primary object of this invention is to provide a one-strike wedging type blank nail which facilitates an operation to join wooden or other articles, positively maintains such articles in pressure contact, rigidly joins any types of surfaces, and assures an excellent design effect.

Other objects of this invention will be readily apparent from the following description of the preferred embodiments.

DETAILED DESCRIPTION OF THE PREFERRED EMBODIMENTS

Embodiments of this invention will be described in detail hereinafter with reference to the drawings. (First Embodiment)

Figure 1:
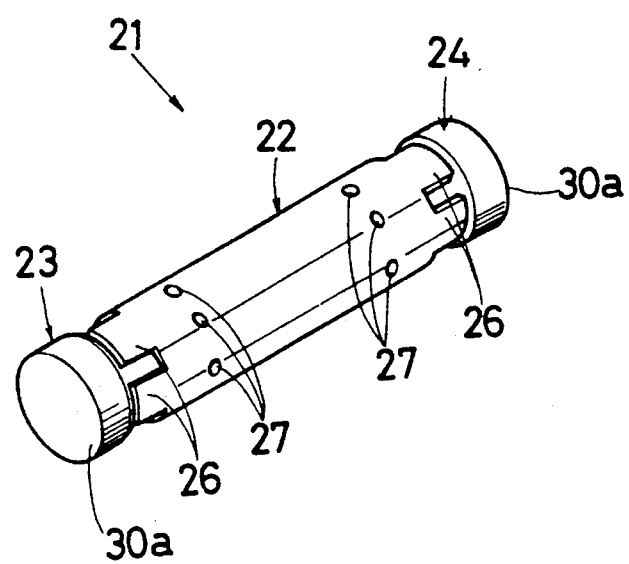
FIG. 1 is a perspective view of a one-strike wedging type blank nail in a first embodiment of the present invention.

FIG. 1 is a perspective view of a one-strike wedging type blank nail 21. As seen, this blank nail 21 comprises a main body 22 in the form of a hollow metal pipe, and two expander elements 23 and 24 also formed of a metal and attached to opposite ends of the main body 22.

Figure 2:
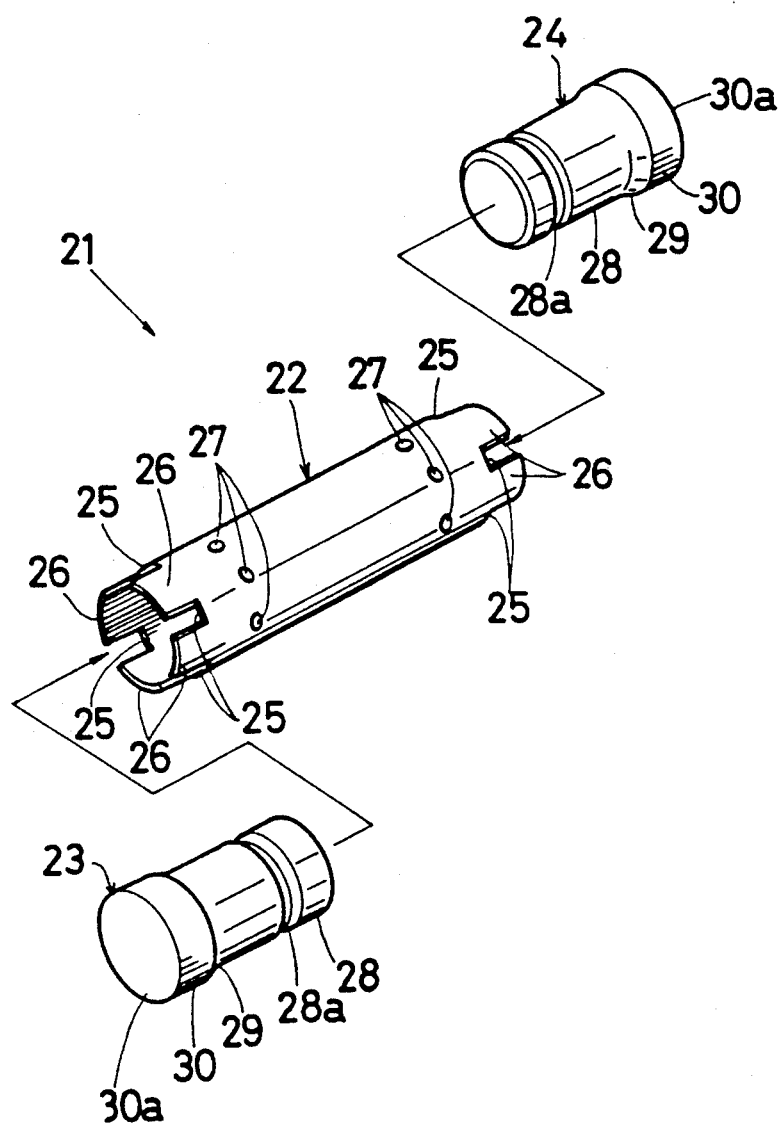
FIG. 2 is an exploded perspective view of the blank nail shown in FIG. 1.

The main body 22 will be described first with reference to FIG. 2 which is an exploded perspective view of FIG. 1. The main body 22 defines four split slots 25 extending axially in each end region thereof, and a total of four wedging pieces 26 equidistantly arranged with the split slots 25 in between. The main body 22 includes a plurality of bulges 27 arranged circumferentially on inside walls thereof at a predetermined distance inwardly from the wedging pieces 26.

Each of the expander elements 23 and 24 includes a contained portion 28, a flare portion 29 and a large diameter portion 30. The contained portion 28 has a diameter for fitting into the main body 22. The expander elements 23 and 24, respectively, define annular retainer grooves 28a in positions opposed to the above-mentioned bulges 27 when the expander elements 23 and 24 are initially attached to the main body 22 (see FIG. 1). In the initial state, the retainer grooves 28a engage the bulges 27 to secure the expander elements 23 and 24 to the main body 22.

The large diameter portion 30 has a larger diameter than the contained portion 28 by a wall thickness of the main body 22. This construction causes the wedging pieces 26 to extend outwardly when the large diameter portion 30 is forced into the main body 22. The two large diameter portions 30 have outer end surfaces defining input surfaces 30a, respectively, for receiving forces that compress the expander elements 23 and 24 toward each other.

The flare portion 29 is a portion progressively diverging to facilitate press fitting of the large diameter portion 30 into the main body 22. The flare portion 29 has a curved surface in this embodiment, but may have a straight slope.

Figure 3:
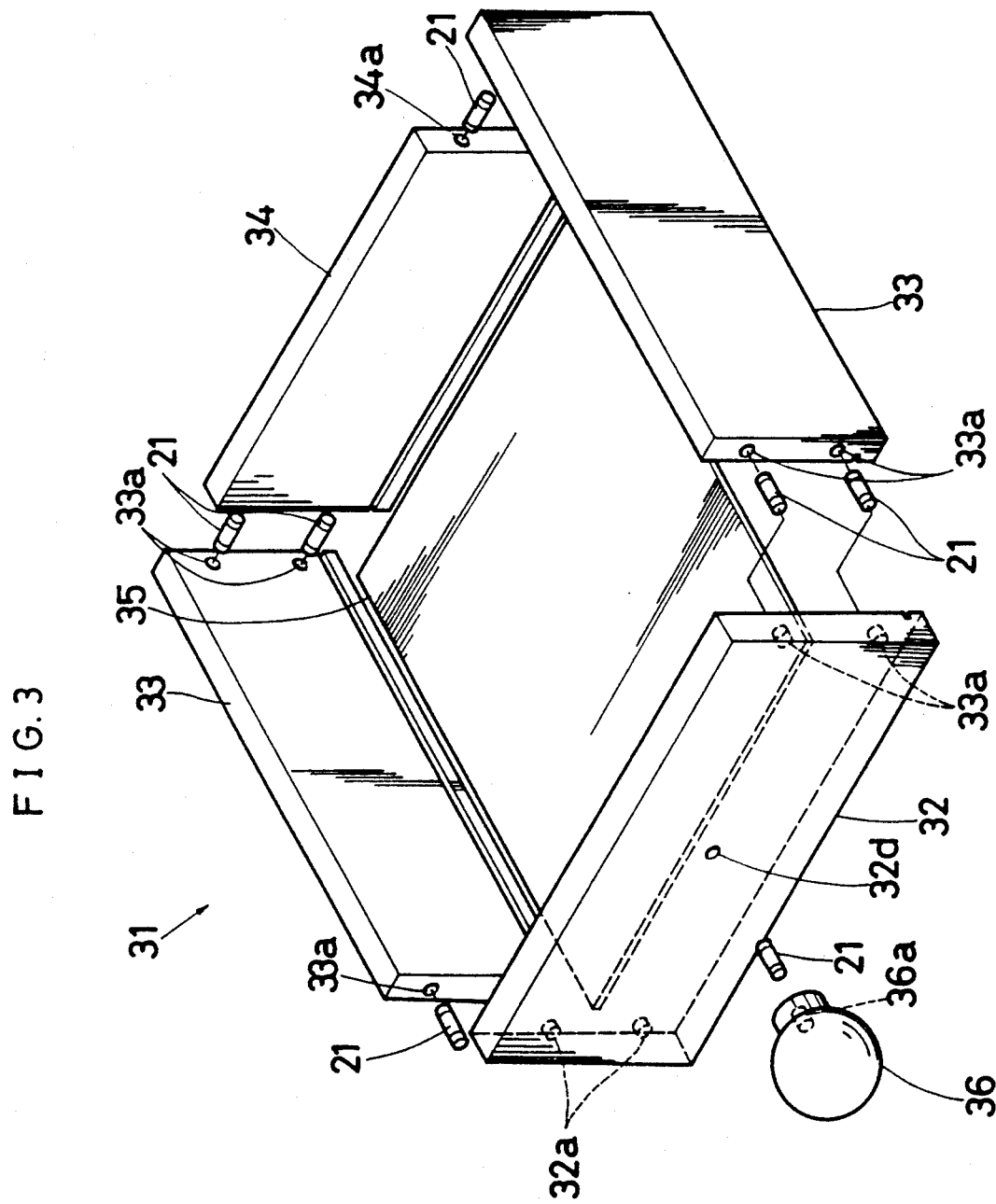
FIG. 3 is a perspective view showing one example in which one-strike wedging type blank nails are used.

An example in which the one-strike wedging type blank nail 21 having the above construction is used will be described next with reference to FIG. 3 which shows assembly of a wooden drawer.

A drawer 31 includes a front board 32, opposite side boards 33, a back board 34 and a bottom board 35. These boards 32-35 define holes 23a-34a arranged in opposed relations on joining surfaces thereof each for receiving part of the one-strike wedging type blank nail 21. The front board 32 define a hole 32d, which is similar to the other holes 23a-34a, on a front surface thereof for attaching a plastic knob 36.

Figure 4:
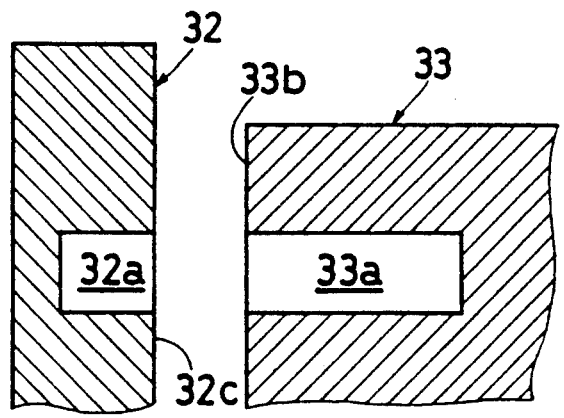
FIG. 4 is an explanatory view of articles joined by the one-strike wedging type blank nail.
Figure 5:
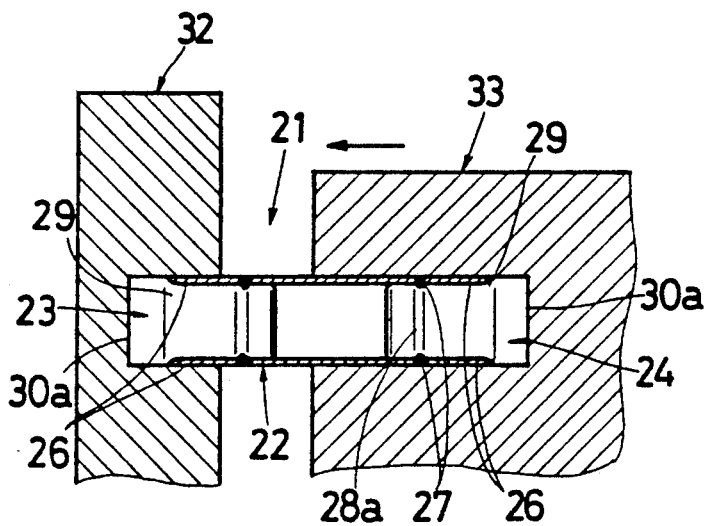
FIG. 5 is an explanatory view showing a joining step using the one-strike wedging type blank nail.

As shown in FIGS. 4 and 5, the holes 23a-34a have depths less than half the length of the one-strike wedging type blank nail 21. Opposed joining surfaces 32a and 33b contact each other when a joining operation is completed.

Figure 7:
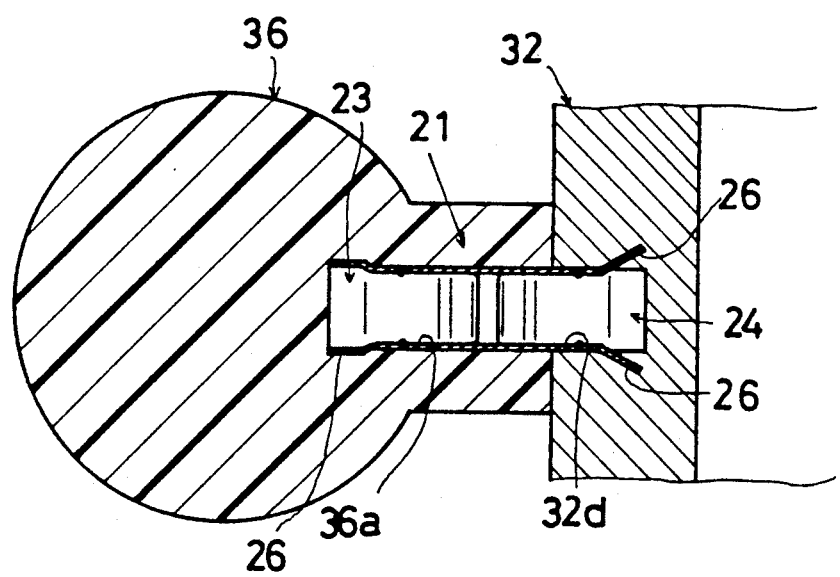
FIG. 7 is an explanatory view of functions of the one-strike wedging type blank nail in the first embodiment.

The joining operation will be described next with reference to FIG. 4 showing joinder of the front board 32 and side board 33 and to FIG. 7 showing joinder of the front board 32 and knob 36. The side board 33 and back board 34 are joined in the same way as the front board 32 and side board 33, and its description will be omitted.

Firstly, as shown in FIG. 5, the opposite ends of the one-strike wedging type blank nail 21 are press-fitted into holes 32a and 33a formed in the joining surfaces of the front board 32 and side board 33. In this way, the two boards 32 and 33 are preassembled with the one-strike wedging type blank nail 21 in between. Then, the other end of the side board 33, for example, is struck in the direction indicated by an arrow toward the front board 32, to apply a pressure in the direction to join the two opposed surfaces.

Figure 6:
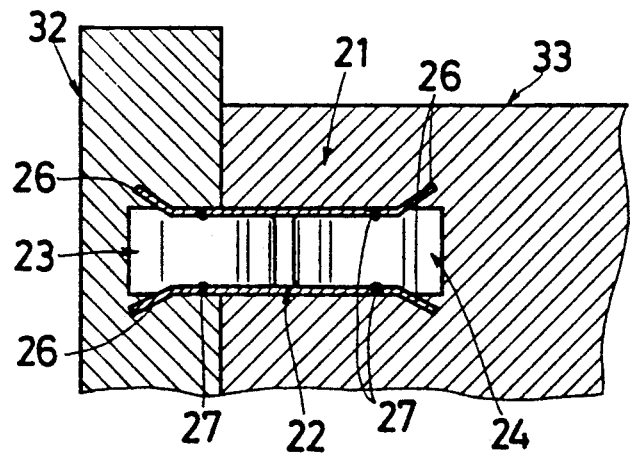
FIG. 6 is an explanatory view showing a joined state.

The above pressure results in pressures inputted to the input surfaces 30a of the two expander elements 23 and 24. The expander elements 23 and 24 then move toward each other into the main body 22, whereby the wedging pieces 26 formed at the opposite ends of the main body 22 are spread out by the flare portions 29 of the expander elements 23 and 24. Consequently, as shown in FIG. 6, the wedging pieces 26 cut into and become lodged in peripheral inside walls of the holes 32a and 33a.

This cutting and lodging action is effected with the wedging pieces 26 at the opposite ends of the main body 22 spreading toward each other, thereby to hold together the joining surfaces of the two boards 32 and 33. At the same time, the spread wedging pieces 26 are inclined relative to the directions in which fibers extend within the boards 32 and 33, while lying intermittently in the circumferential direction with the presence of the split slots 25. Moreover, the two expander elements 23 and 24 now inside the main body 22 are securely maintained in place by the bulges 27 formed in the main body 22.

The knob 36 is attached similarly. As shown in FIG. 7, the front board 32 and knob 36 define holes 32d and 36a having less than half the length of the one-strike wedging type blank nail 21. In a joining operation, the front board 32 and knob 36 are preassembled with the blank nail 21 interposed between the two joining surfaces, and then the knob 36, for example, is struck toward the front board 32.

Under the pressure thereby applied, the wedging pieces 26 in the front board 32 cut into and become lodged in the fibers of the front board 32 as described above. On the other hand, the wedging pieces 26 in the knob 36 slightly spread against and firmly contact inside peripheries of the hole 36a owing to the elasticity intrinsic to the plastic material.

This wedging action is sufficiently rigid and takes place in the directions to hold together the joining surfaces of the front board 32 and knob 36 as in the joinder of the front board 32 and side board 33.

Thus, firstly, this embodiment has the advantage of facilitating the joining operation.

The spreading directions in which the wedging pieces 26 formed at the opposite ends of the main body 22 coincide with the direction for joining the articles (i.e. the front board 32 and side board 33, or the front board 32 and knob 36). It is therefore possible to maintain the joined state positively and avoid formation of a gap between the joined articles.

Further, a strong joinder is achieved whether the surfaces have cross grain, straight grain or butt end grain, since the wedging pieces 26 cut into the boards 32-34 at angles to the fibers of the boards and, moreover, intermittently in circumferential directions. The strong joinder is assured also for a plastic article such as the knob 36 by means of certain elasticity of the material.

A preassembled state is obtained prior to a joining operation by placing the one-strike wedging type blank nails 21 between the boards 32 and 33 and between the front board 32 and knob 36 as press-fitted into the holes defined on the opposed surfaces to be joined. This allows the subsequent joining operation to be carried out in a faultless manner.

When the joining operation is completed, the one-strike wedging type blank nails 21 ar totally embedded between the joined articles (i.e. the front board 32 and side board 33, or the front board 32 and knob 36). This dispenses with a covering operation, expedites the joining operation, and presents an improved design effect.

Next, examples of joining articles than wooden and plastic articles will b described briefly.

Figure 8:
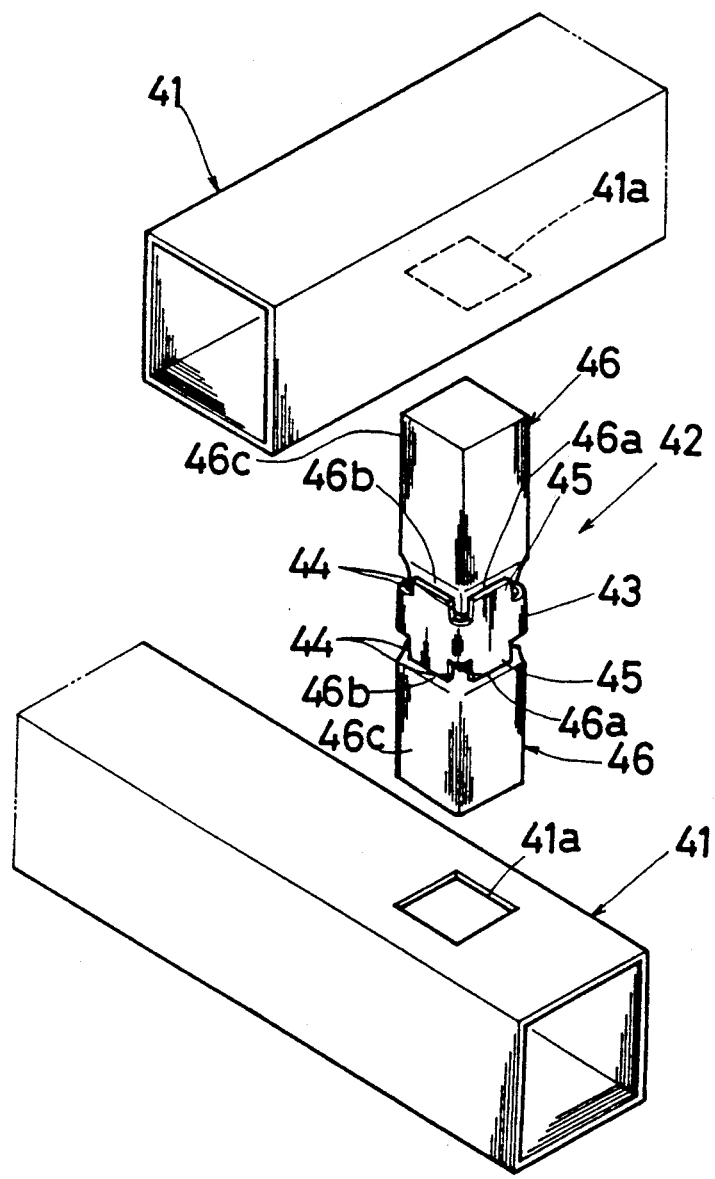
FIG. 8 is a perspective view of a different one-strike wedging type blank nail.

FIG. 8 shows an example of joining square metal pipes 41 as placed one upon the other. A one-strike wedging type blank nail 42 used in this example comprises a main body 43 having a square cross section. The main body 43 defines split slots 44 in the four corners at each end thereof, and hence one wedging piece 45 on each side. The blank nail 42 further comprises expander elements 46 having contained portions 46a press-fitted inside these wedging pieces 45, respectively. Each of the expander elements 46 includes a flare portion 46b disposed outwardly of and continuous with the contained portion 46a and defining a curved flare surface, and a large diameter portion 46c disposed outwardly of and continuous with the flare portion 46b and having the same diameter as the main body 43.

This one-strike wedging type blank nail 42 has a predetermined length exceeding a sum of inside diameters of the metal pipes 41 to be joined.

The two metal pipes 41 have joining surfaces defining bores 41a sized to receive the one-strike wedging type blank nail 42.

Figure 9:
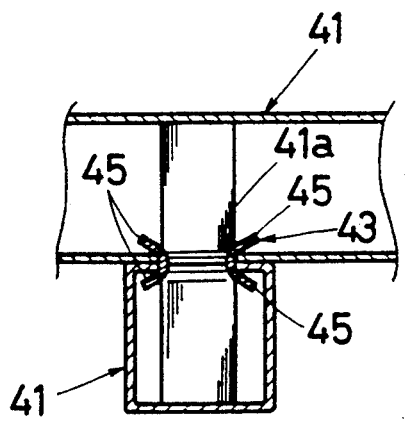
FIG. 9 is an explanatory view of functions of the blank nail shown in FIG. 8.

In a joining operation, the metal pipes 41 are preassembled with opposite ends of the one-strike wedging type blank nail 42 inserted into the bores 41a in the joining surfaces. Subsequently, the upper metal pipe 41, for example, is pressed down to apply a pressure in the direction to join the joining surfaces of the two metal pipes 41. With this pressure application, the wedging pieces 45 on the main body 43 are bent outwardly as shown in FIG. 9, and become lodged in a manner to saddle the bores 41a in the joining surfaces of the metal pipes 41.

Figure 10:
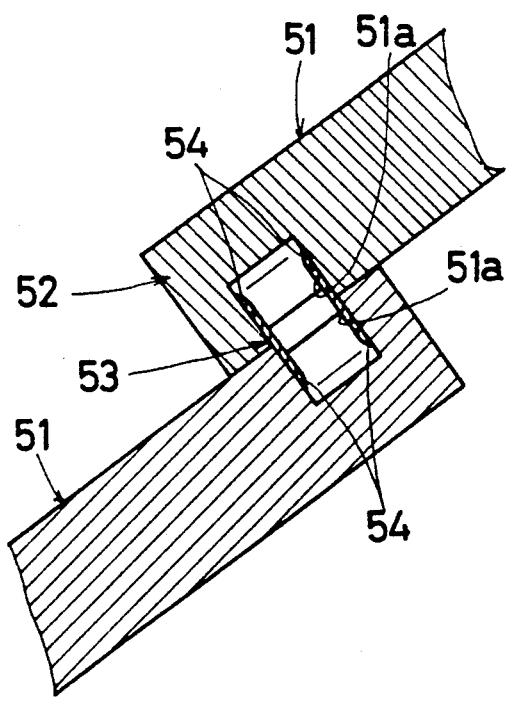
FIG. 10 is an explanatory view of functions of another example.

FIG. 10 is an explanatory view showing joinder of roof tiles 51 which are one example of ceramics. As illustrated, a one-strike wedging type blank nail 52 comprises a main body 53 having wedging pieces 54 formed at opposite ends thereof and pressed against inside peripheries of holes 51a defined in the tiles 51.

Figure 11:
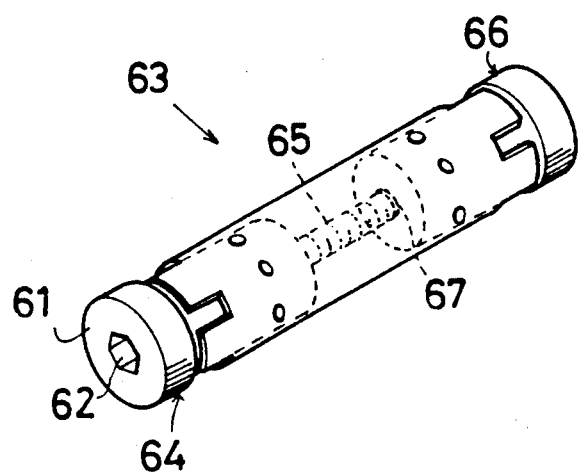
FIG. 11 is a perspective view of a further example.

In the foregoing embodiment and its modifications, the expander elements have flat input surfaces. However, as shown in FIG. 11, for example, an input surface 61 may define an input recess 62 for receiving torque from an engaging tool (not shown). More particularly, the one-strike wedging type blank nail 63 shown in FIG. 11 comprises an expander element 64 having the input recess 62 and a screw 65 extending, as shown in broken lines, from a forward surface thereof. An opposite expander element 66 defines a threaded bore 67 for meshing with the screw 65. Thus, the two expander elements 64 and 66 may be moved closer together gradually without relying on a striking action. In this case, an article that receives the expander element 64 defining the input recess 62 may have a bore (not shown) for allowing manipulation of the engaging tool (not shown).

The wedging pieces described hereinbefore correspond to wedging portions recited in the claims.

SECOND EMBODIMENT

Figure 12:
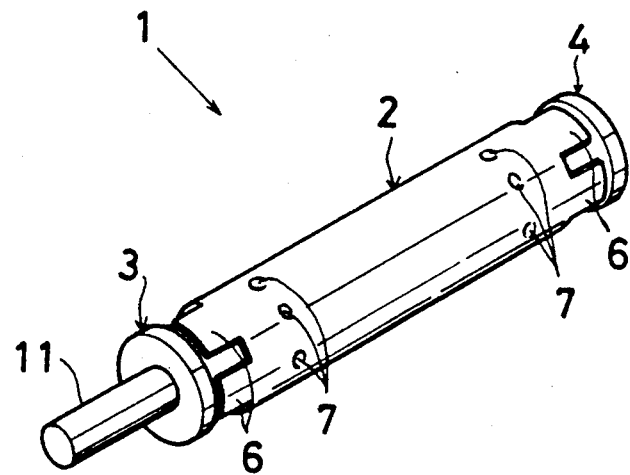
FIG. 12 is a perspective view of a one-strike wedging type blank nail in a second embodiment.

FIG. 12 is a perspective view of a one-strike wedging type blank nail 1. As in the first embodiment described above, this blank nail 1 comprises a main body 2 in the form of a hollow metal pipe, and two expander elements 3 and 4 also formed of a metal and attached to opposite ends of the main body 2. Like numerals are used to identify like parts in the first embodiment and will not particularly be described again.

Figure 13:
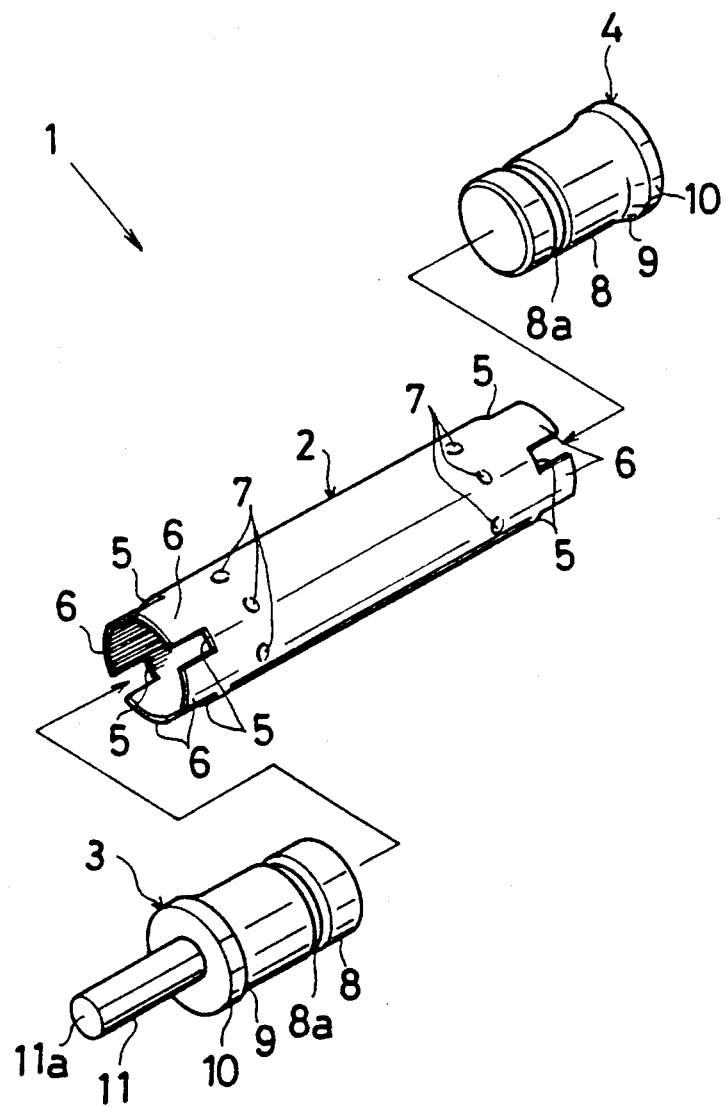
FIG. 13 is an exploded perspective view of the blank nail shown in FIG. 12.

As shown in FIG. 13, the main body 2 defines four split slots 5 extending axially in each end region thereof to form wedging pieces 6. The main body 2 includes a plurality of bulges 7 arranged circumferentially on inside walls thereof at a predetermined distance inwardly from the wedging pieces 6.

The two expander elements 3 and 4 are differentiated as an expander element 3 for input and an expander element 4 for bearing. Each of the expander elements 3 and 4 includes a contained portion 8, a flare portion 9 and a large diameter portion 10. The two expander elements 3 and 4 are different in that the expander element 3 for input includes an input pin 11 projecting therefrom.

Each contained portion 8 is constructed for fitting into the main body 2, which is maintained in the contained state by an annular retainer groove 8a.

The large diameter portion 10 has a larger diameter than the contained portion 8 by a wall thickness of the main body 2. This construction causes the wedging pieces 6 to extend outwardly when the large diameter portion 10 is forced into the main body 2.

The flare portion 9 has a curved surface to facilitate press fitting of the large diameter portion 10 into the main body 2.

The input pin 11 is used for pressing the input expander element 3 into the main body 2, and at the same time pressing the bearing expander element 4 into the main body 2. The input pin 11 has such a length that, when the pin 11 is struck in to spread open the wedging pieces 6 at the opposite ends of the main body 2, an end face of the pin 11 is flush with an outer surface of a wooden article joined.

An example in which the one-strike wedging type blank nail 1 having the above construction is used will be described next with reference to FIGS. 14 through 16. These drawings show a horizontal board 12 and a vertical board 13 joined at right angles to each other, which is one example where the blank nail 1 is applicable.

Figure 14:
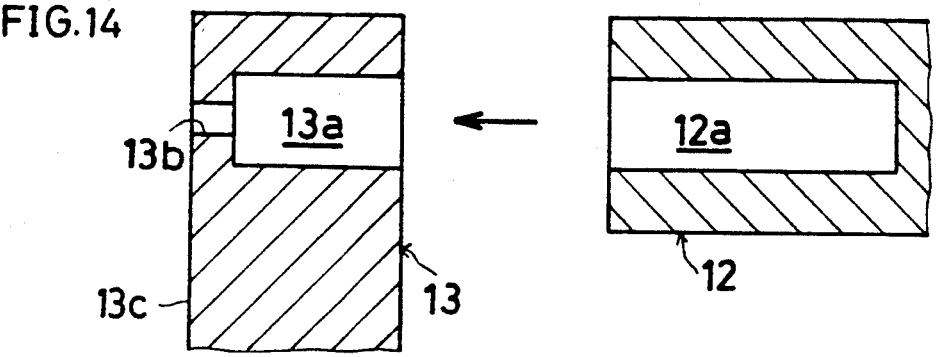
FIG. 14 is an explanatory view of articles joined by the one-strike wedging type blank nail in the second embodiment.

As shown in FIG. 14, holes 12a, 13a and 13b are formed for placing the one-strike wedging type blank nail 1 in joining surfaces of the horizontal board 12 and vertical board 13 to be joined. The horizontal board 12 defines the hole 12a for receiving the end of the one-strike wedging type blank nail 1 including the bearing expander element 4. The vertical board 13 defines the holes 13a and 13b for receiving the opposite end of the blank nail 1. Specifically, a two-step bore is formed in the vertical board 13, including the hole 13a corresponding in diameter to the hole 12a formed in the horizontal board 12, and the hole 13b for receiving the input pin 11. All of these holes 12a, 13a and 13b are formed to be somewhat small, so that the blank nail 1 is press-fitted in place.

Figure 15:
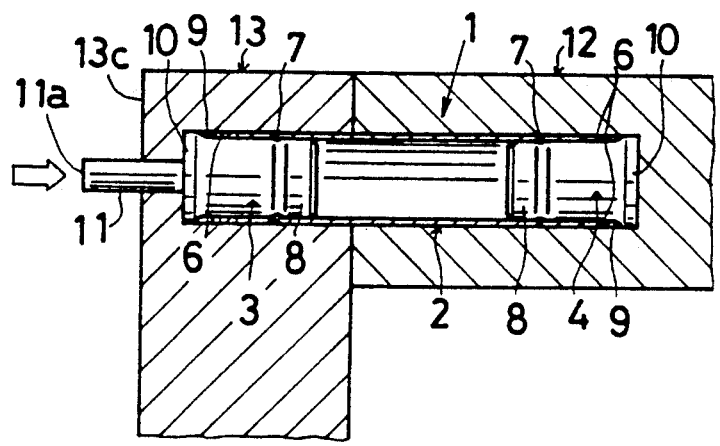
FIG. 15 is an explanatory view showing a joining step using the one-strike wedging type blank nail in the second embodiment.
Figure 16:
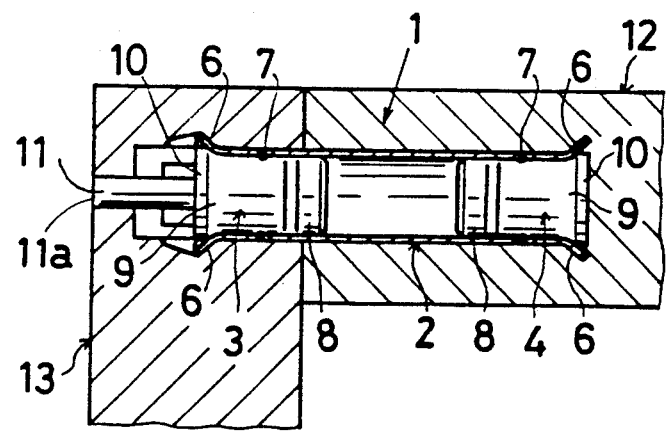
FIG. 16 is an explanatory view showing a joined state.

FIG. 15 shows a state in which the horizontal board 12 and vertical board 13 are assembled with the one-strike wedging type blank nail 1 extending therebetween. In this state, the input pin 11 projects from an outer surface 13c of the vertical board 13.

A joining operation may be carried out simply by striking at the projecting input pin 11.

When the input pin 11 is struck, the input expander element 3 is pressed toward the center of the main body 2. Consequently, as shown in FIG. 16, the wedging pieces 6 are spread out with tip ens of thereof guided along the flare portion 9, cutting in at angles to a direction in which fibers extend in the vertical board 13 and intermittently in the circumferential direction. At the same time, the main body 2 moves toward the bearing expander element 4. With this movement, the wedging pieces 6 are spread out by the large diameter portion 10 along the flare portion 9, to cut into the horizontal board 12.

The two expander elements 3 and 4 pressed into the main body 2 are securely maintained in place by the bulges 7 formed in the main body 2.

According to this embodiment, the joining surfaces of the articles to be joined (i.e. the horizontal board 12 and vertical board 13) are placed in contact with each other in a preassembled state preceding the joining operation, Thus, this embodiment has the advantage, in addition to the advantages of the first embodiment, of enabling preassembly in a more complete way to realize the joining operation with improved accuracy.

The excellent design effect is not diminished since the input pin 11 has a small end face 11a which need not define a slotted head or Phillips head.

Further, since the input pin 11 has a small end face 11a as noted above, a covering operation may be carried out with ease.

In the above embodiment, the input pin 11 has a length predetermined so that, when struck in, the end face 11a becomes flush with the outer surface 13c of the vertical board 13. Instead, a projecting portion of the input pin 11 may be cut after the joining operation. It is also possible to use a bar-shaped tool (not shown) thinner than the input pin 11 to strike the latter, and the hole 13b formed in the vertical board 13 may be covered after the joining operation.

In this case, the input pin 11 may define a hole in the end face 11a for receiving a forward end of an engaging tool (not shown), to compress the blank nail 1 gradually.

The articles to be joined are not limited to wooden articles, but may be metals and ceramics.

The wedging pieces 6 correspond to the wedging portions recited in the claims.

What is claimed is:

1. A one-strike wedging type blank nail to be lodged fixedly between joining surfaces of articles to be jointed, for securing joining the articles, comprising:
   a main body in form of a hollow circular pipe for interposition between said joining surfaces, said main body defining split slots extending axially at opposite ends thereof to form wedging portions and having a first and a second set of inwardly directed bulges disposed near said split slots; and
   a pair of circular cylindrical expander elements attached to the opposite ends of said main body, respectively, each of said expander elements including a contained portion fitted into said main body, said contained portions defining annular retainer grooves for initially engaging the respective sets of bulges of said main body, a large diameter portion having a larger diameter than said contained portions, and a flare portion formed between and continuous with said contained portion and said large diameter portion, the contained portions being opposed to each other;
   said large diameter portion of each of the expander elements defining an outward end surface acting as an input surface for receiving a compressive force applied in a direction to move said expander elements toward each other.

2. A one-strike wedging type blank nail to be lodged fixedly between joining surfaces of articles to be joined, for securing joining the articles, comprising:
   a main body in form of a hollow circular pipe for interposition between said joining surfaces, said main body defining split slots extending axially at opposite ends thereof to form wedging portions and having a first and a second set of inwardly directed bulges disposed near said split slots; and
   a pair of circular cylindrical expander elements attached to the opposite ends of said main body, respectively, each of said expander elements including a contained portion fitted into said main body, said contained portions defining annular retainer grooves for initially engaging the respective sets of bulges of said main body, a large diameter portion having a larger diameter than said contained portion, and a flare portion formed between and continuous with said contained portion and said large diameter portion, the contained portions being opposed to each other;
   said large diameter portion of one of the expander elements including an input pin projecting from an outward end surface thereof for spreading said wedging portions upon application of an external force, said input pin being of a solid circular cylinder having a smaller diameter than said large diameter portion.

* * * * *